Jan. 13, 1925.
J. A. TONE
PENDULUM LEVEL
Filed April 26, 1923
1,523,315
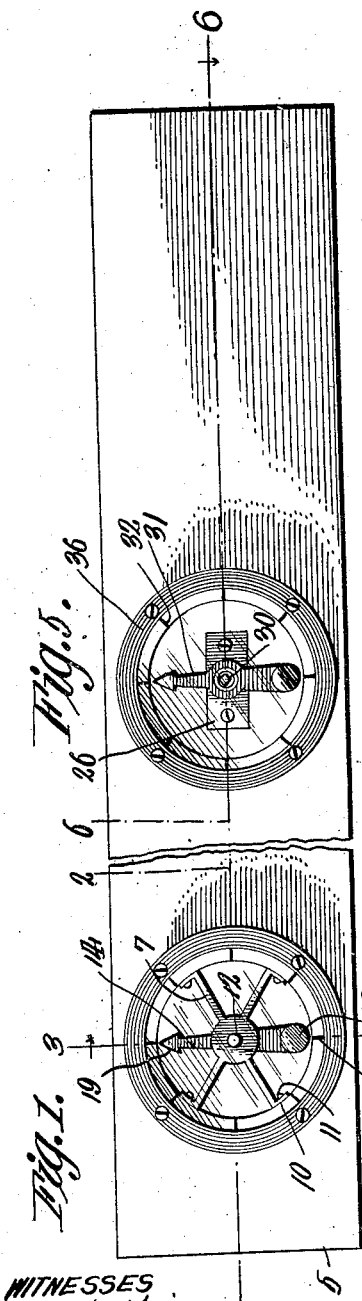
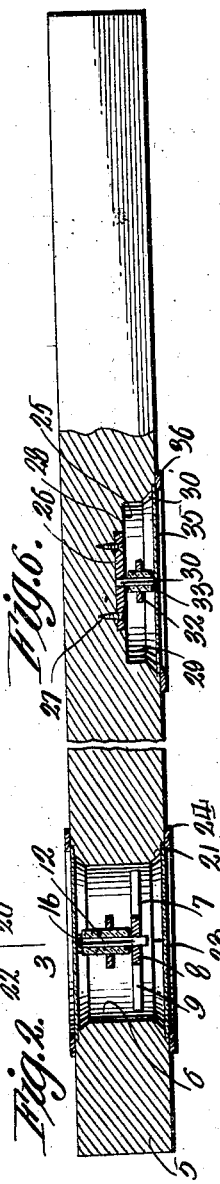
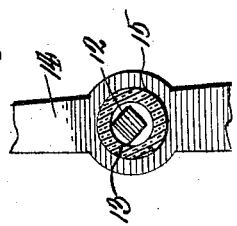
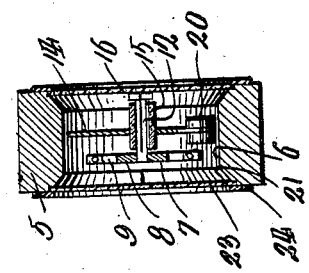
WITNESSES
Inventor
JOHN A. TONE
By Richard B. Owen, Attorney Patented Jan. 13, 1925.

1,523,315

UNITED STATES PATENT OFFICE.

JOHN A. TONE, OF McMINNVILLE, OREGON.

PENDULUM LEVEL.

Application filed April 26, 1923. Serial No. 634,819.

*To all whom it may concern:*

Be it known that I, JOHN A. TONE, a citizen of the United States, residing at McMinnville, in the county of Yamhill and State of Oregon, have invented certain new and useful Improvements in a Pendulum Level, of which the following is a specification.

This invention relates to plumbs and levels and the primary object of the invention is to provide a novel gravity plumb and level, which eliminates the necessity of providing the usual spirit level tube.

Another prime object of the invention is to provide an improved plumb and level embodying a stock, a weighted pointer rotatably disposed within the stock and novel means for mounting the pointer in the stock for facilitating the easy rotation thereof.

A still further object of the invention is to provide an improved plumb and level of the above character, which will be durable and efficient in use, one that will be simple and easy to manufacture and one which can be placed upon the market at a reasonable cost.

With these and other objects in view, the invention consists in the novel construction, arrangement and formation of parts, as will be hereinafter more specifically described claimed and illustrated in the accompanying drawings, in which drawings:

Figure 1 is a fragmentary front elevation of a plumb level constructed in accordance with this invention.

Figure 2 is a horizontal section taken on the line 2—2 of Figure 1.

Figure 3 is a vertical transverse section through the improved plumb level taken on the line 3—3 of Figure 1.

Figure 4 is an enlarged fragmentary section through the improved plumb and level showing the means of mounting the pointer in position.

Figure 5 is a fragmentary front elevation of a slightly modified form of the plumb and level.

Figure 6 is a horizontal section through the same taken on the line 6—6 of Figure 5.

Referring to the drawings in detail, wherein similar reference characters designate corresponding parts throughout the several views, the numeral 5 indicates the stock of the improved plumb and level which can be made of hard wood or any other preferred material. As shown the stock 5 is provided with a large central opening 6 extending entirely through the same. The opening 6 has mounted therein a spider 7, which embodies the axially disposed hub plate 8 with the radially extending arms 9. These arms 9 terminate in angularly extending feet 10 which can be secured by means of fastening elements 11 to the walls of the opening 6. The hub 8 of the spider is preferably disposed exactly at the axial center of the opening and supports an inwardly extending bearing pin 12 which is preferably formed polygonal-shaped in cross section to provide a plurality of bearing points 13, the purpose of which will be hereinafter more fully described.

The indicating pointer 14 is adapted to be mounted upon a pivot pin 12 and at its axial center carries a hub sleeve 15 which is preferably formed of glass. This glass sleeve 15 is secured to the pointer 14 in any preferred way. As shown, the sleeve 15 is mounted directly upon the pivot pin 12 and the free end of the pivot pin is preferably provided with a nut or the like 16 to prevent the accidental displacement of the pointer 14 from off the same. One end of the pointer 14 is preferably provided with indicating arrow-shaped head 19, while the opposite end is preferably weighted as at 20, so that the pointer will be normally held at a vertical position irrespective of the position of the stock 5, thereby showing whether or not the stock is held in a level position. In order to indicate the angle at which the stock is held, the wall of the opening 6 is preferably beveled as at 21 and provided with suitable indicating marks 22 as clearly shown in Figure 1 of the drawings.

The extreme outer ends of the wall opening 6 are rabbeted and in the rabbeted portions are placed suitable protecting glasses or panes 23 and if so desired retaining rings 24 can be provided for holding the said panes in place.

In Figures 5 to 6 inclusive I have shown a slightly modified form of this invention in which instead of providing an opening 6 all the way through the stock I simply provide a circular recess 25 and secured in the recess is an attaching plate 26 by means of screws or the like 27 which extend through the rear wall 28 defined by the recess 25. The recess 25 besides defining the rear wall 28 also defines the annular side wall 29 which can be beveled as at 30 to permit the indicating marks 31 to be marked thereon. This plate 26 supports the outwardly extending polygonal-shaped spindle 30 which is made the same as the spindle 12 and rotatably mounted upon this spindle is a pointer 31 constructed the same as the pointer 14, and thus it can be seen that the hub of this pointer is provided with an elongated cylindrical glass hub 33. The pointer is of course protected by a suitable transparent plate or pane 35 held in place by a ring 36.

The improved plumb and level may be made in the ordinary manner and the stock is of course laid upon the work as in the ordinary practice and any deviation in the inclination of the work from the horizontal will be shown by the pointer.

Changes in details may be made without departing from the spirit or the scope of this invention.

What I claim as new is:

1. A plumb and level comprising a stock having a cylindrical opening therethrough, a spider carried by the wall of the opening, a pin carried by the spider, extending axially of and in the opening, a pointer including an elongated glass hub mounted upon said pin for rotary movement, the pointer being weighted at one end, the outer ends of said openings being beveled, said beveled portions having indicating marks thereon, protecting plates carried by the stock arranged to cover the opening, and means for holding said protecting plates is position.

2. In a plumb and level, a stock having a cylindrical recess therein, a supporting spider formed in the recess including a hub and radially extending arms formed on the hub, supporting feet formed on the outer terminals of the arms, said arms being secured to he wall of the recess, a pin polygonal in cross section carried by the hub of the spider and disposed axially of the recess, an indicating pointer including an elongated hub mounted upon the pin, the wall of the recess being beveled and provided with indicating marks, and a protecting plate secured to the stock and covering said pointer and said indicating marks.

In testimony whereof I affix my signature in presence of two witnesses.

JOHN A. TONE

Witnesses:
  FRANK W. FENTON,
  NELLIE B. HODSON.